(12) United States Patent
Yanaru et al.

(10) Patent No.: US 6,788,990 B1
(45) Date of Patent: Sep. 7, 2004

(54) PROCESS CONTROL DEVICE AND PROCESS CONTROL METHOD

(75) Inventors: Taichi Yanaru, Hyogo (JP); Masataka Okabe, Hyogo (JP); Hirofumi Ohtsuka, Hyogo (JP)

(73) Assignees: Renesas Technology Corp., Tokyo (JP); Ryoden Semiconductor System Engineering Corporation, Hyogo (JP)

(*) Notice: Subject to any disclaimer, the term of this patent is extended or adjusted under 35 U.S.C. 154(b) by 363 days.

(21) Appl. No.: 09/656,839

(22) Filed: Sep. 7, 2000

(30) Foreign Application Priority Data

Mar. 10, 2000 (JP) ................................. 2000-066477

(51) Int. Cl.$^7$ .............................................. G06F 19/00
(52) U.S. Cl. ........................ 700/121; 700/99; 700/103
(58) Field of Search ........................... 700/97, 99–103, 700/121

(56) References Cited

U.S. PATENT DOCUMENTS

| | | | | |
|---|---|---|---|---|
| 5,446,669 A | * | 8/1995 | Yamashita et al. | 700/100 |
| 5,625,560 A | * | 4/1997 | Kikuchi | 700/103 |
| 5,980,086 A | * | 11/1999 | Kanematsu et al. | 700/101 |
| 6,174,375 B1 | * | 1/2001 | Sada et al. | 118/715 |
| 6,256,548 B1 | * | 7/2001 | Lin | 700/121 |
| 6,353,769 B1 | * | 3/2002 | Lin | 700/101 |
| 6,463,350 B2 | * | 10/2002 | Fukuda et al. | 700/121 |
| 6,529,792 B1 | * | 3/2003 | Sato et al. | 700/121 |
| 6,584,371 B1 | * | 6/2003 | Sada et al. | 700/116 |
| 2002/0107599 A1 | * | 8/2002 | Patel et al. | 700/99 |

FOREIGN PATENT DOCUMENTS

| | | |
|---|---|---|
| JP | 4-63417 | 2/1992 |
| JP | 6-168865 | 6/1994 |

* cited by examiner

Primary Examiner—Leo Picard
Assistant Examiner—Elliot Frank
(74) Attorney, Agent, or Firm—McDermott Will & Emery LLP

(57) ABSTRACT

A process control device controls a plurality of processing devices placed in parallel to perform at least two process steps for consecutively processing workpieces in a lot. The process control device includes a device group information for grouping of a plurality of processing devices into a plurality of device groups. For example, when the workpieces are semiconductor devices, processing devices having identical deviating characteristics are grouped into the same group to perform a plurality of photolithographic steps. The process control device further includes a device group selecting unit for selecting the device group such that the lot is processed in the second process step using a processing device included in the same device group as a processing device used in the first process step.

16 Claims, 13 Drawing Sheets

FIG. 7

FDLOTDB (LOT-IN-PROCESS FILE)

| ITEM NAME | DATA | DESCRIPTION |
|---|---|---|
| lot_id | AA00100 | LOT MANAGEMENT NUMBER |
| prod_id | CHIP000001 | PRODUCT TYPE INDEX |
| route_id | ROUTE001 | PROCESS ROUTE TAG, PROCESS FLOW |
| oper_no | 00500 | NEXT PROCESS STEP NAME |
| toolg | SQA0001 | NEXT PROCESSING DEVICE GROUP NAME |

FIG. 8

FDPROUT (PROCESS ROUTE TAG, PROCESS FLOW)

| ITEM NAME | route_id | oper_no | toolg | pc_flg | pd_flg | sgs_area_id |
|---|---|---|---|---|---|---|
| DATA | ROUTE001 | 00100 | SHA0001 | | | |
| | ROUTE001 | 00200 | SWA0001 | | | |
| | ROUTE001 | 00300 | SDA0001 | | | |
| | ROUTE001 | 00400 | SEP0001 | | | |
| | ROUTE001 | 00500 | SQA0001 | | | |
| | ROUTE001 | 00600 | SPA0001 | Y | | X1 |
| | ROUTE001 | 00700 | SQA0002 | | | |
| | ROUTE001 | 00800 | SWA0002 | | | |
| | ROUTE001 | 00900 | SDA0002 | | | |
| | ROUTE001 | 01000 | SEP0002 | | | |
| | ROUTE001 | 01100 | SPA0002 | Y | | E1 |
| | ROUTE001 | 01200 | SEP0001 | | | |
| | ROUTE001 | 01300 | SPA0001 | | Y | X1 |
| | ROUTE001 | 01400 | SQA0002 | | | |
| | ROUTE001 | 01500 | SWA0002 | | | |
| | ROUTE001 | 01600 | SDA0002 | | | |
| | ROUTE001 | 01700 | SEP0002 | | | |
| | ROUTE001 | 01800 | SPA0002 | | Y | E1 |
| | ROUTE001 | 01900 | SDA0002 | | | |
| | ROUTE001 | 02000 | SEP0002 | | | |
| | ROUTE001 | 02100 | SPA0001 | | Y | X1 |
| | ROUTE001 | 02200 | SDA0002 | | | |
| | ROUTE001 | 02300 | SEP0002 | | | |
| | ROUTE001 | 02400 | SPA0002 | | Y | E1 |
| | ROUTE001 | 02500 | SWA0001 | | | |
| | ROUTE001 | 02600 | SDA0001 | | | |
| | ROUTE001 | 02700 | SEP0001 | | | |
| DESCRIPTION | PROCESS ROUTE TAG, PROCESS FLOW | PROCESS STEP NAME | DEVICE GROUP NAME | DETERMINATION STEP FLAG | APPLICATION STEP FLAG | SAME DEVICE SELECTION STEP FLAG |

FIG. 9

FDTOOLG (DEVICE GROUP)

| ITEM NAME | toolg | tool |
|---|---|---|
| DATA | SPA0001 | PA101 |
| | SPA0001 | PA102 |
| | SPA0001 | PA103 |
| | SPA0001 | PA104 |
| | SPA0001 | PA105 |
| | SPA0002 | PA106 |
| | SPA0002 | PA107 |
| | SPA0002 | PA108 |
| | SPAG21A | PA101 |
| | SPAG21B | PA102 |
| | SPAG21C | PA103 |
| | SPAG21D | PA104 |
| | SPAG21E | PA105 |
| | SPAG21F | PA106 |
| | SPAG21G | PA107 |
| | SPAG21H | PA108 |
| DESCRIPTION | DEVICE GROUP NAME | DEVICE NAME |

FIG. 11

FDCPARM(DETERMINATION STEP CONTROL METHOD)

| ITEM NAME | DATA | DESCRIPTION |
|---|---|---|
| route_id | ROUTE001 | PROCESS ROUTE TAG, PROCESS FLOW |
| oper_no | 00500 | PROCESS STEP NAME |
| parm_id | STG_TOOL_X1 | CONTROL RETRIEVAL KEY INDEX |
| parm_type | 5 | CONTROL METHOD INDEX |

FIG. 12

FDSTGRP(PHOTOLITHOGRAPHIC DEVICE GROUP DEFINITION)

| ITEM NAME | prod_id | sgs_area_id | toolg | alloc_ratio | dist_flg |
|---|---|---|---|---|---|
| DATA | CHIP000001 | X1 | SPAG21A | 02 | 0 |
| | CHIP000001 | X1 | SPAG21B | 01 | 0 |
| | CHIP000001 | X1 | SPAG21C | 03 | 0 |
| | CHIP000001 | X1 | SPAG21D | 02 | 0 |
| | CHIP000001 | X1 | SPAG21E | 01 | 0 |
| | CHIP000001 | E1 | SPAG21F | 02 | 1 |
| | CHIP000001 | E1 | SPAG21G | 01 | 1 |
| | CHIP000001 | E1 | SPAG21H | 03 | 1 |
| DESCRIPTION | PRODUCT TYPE INDEX | SAME DEVICE SELECTION STEP FLAG | DEVICE GROUP NAME | LOT ALLOCATION RATIO (UPPER LIMIT) | ALLOCATION METHOD DEFINITION |

FIG. 13

FDSTGACT (PHOTOLITHOGRAPHIC DEVICE GROUP SITUATION)

| ITEM NAME | prod_id | sgs_area_id | toolg | alloo_act |
|---|---|---|---|---|
| DATA | CHIP000001 | X1 | SPAG21A | 02 |
| | CHIP000001 | X1 | SPAG21B | 01 |
| | CHIP000001 | X1 | SPAG21C | 02 |
| | CHIP000001 | X1 | SPAG21D | 01 |
| | CHIP000001 | X1 | SPAG21E | 01 |
| | CHIP000001 | E1 | SPAG21F | 01 |
| | CHIP000001 | E1 | SPAG21G | 00 |
| | CHIP000001 | E1 | SPAG21H | 03 |
| DESCRIPTION | PRODUCT TYPE INDEX | SAME DEVICE SELECTION STEP FLAG | DEVICE GROUP NAME | LOT ALLOCATION RATIO (ACTUAL) |

FIG. 14

FDAPARM (DETERMINATION STEP CONTROL METHOD)

| ITEM NAME | DATA | DESCRIPTION |
|---|---|---|
| route_id | ROUTE001 | PROCESS ROUTE TAG, PROCESS FLOW |
| oper_no | 01300 | PROCESS STEP NAME |
| parm_id | STG_TOOL_X1 | CONTROL RETRIEVAL KEY INDEX |
| parm_type | 5 | CONTROL METHOD INDEX |

FIG. 15

FDPARVAL (ALLOCATION RESULT HOLDING)

| ITEM NAME | DATA | DESCRIPTION |
|---|---|---|
| lot_id | AA00100 | LOT MANAGEMENT NUMBER |
| parm_id | STG_TOOL_X1 | CONTROL RETRIEVAL KEY INDEX |
| toolg | SPAG21A | DEVICE GROUP NAME |

PROCESS CONTROL DEVICE AND PROCESS CONTROL METHOD

BACKGROUND OF THE INVENTION

1. Field of the Invention

The present invention relates to a process control device and a process control method for control of process steps in which high precision processing is applied to a lot. More particularly, the present invention relates to a process control device and a process control method for control of at least two process steps that are applied to the same lot, before the lot is completed, at the same processing part having a plurality of processing devices placed in parallel therein.

2. Description of the Background Art

In manufacture of various kinds of semiconductor devices such as DRAMs, it is often the case that one process step is performed by a plurality of processing devices placed in parallel with one another to increase production efficiency. In such a process step, each processing object (hereinafter, referred to as "workpiece" or "lot") for which a preceding process step has been completed is successively allocated to one of the plurality of processing devices that is currently available. If this process step is of the kind that requires extremely high precision processing, like a photolithographic step, processing results often vary even if the same mask is used under the same processing conditions. This is due to subtle differences in lens property or spectral distribution from a light source of respective processing devices, which are integrated to produce variation in the processing result. For the semiconductor devices such as DRAMs, miniaturization of products have been drastically advanced, and processing devices have reached their limit in capability. Such variation in the processing results according to the processing devices would cause considerable variation in product characteristics, and it would further increase a proportion of the products for which the processing should be done again (hereinafter, a "redo rate"). This hinders the improvement in productivity.

A proposal has been made to suppress such variation uncontrollable by processing conditions. It states that, if a workpiece is of the kind that is subjected to identical processing more than once at a processing part having a plurality of processing devices provided in parallel therein, the workpiece should be processed by the same processing device in such process steps (Japanese Patent Laying-Open No. 6-168865). Respective processing devices exhibit subtle deviating inclinations specific thereto, which may appear in different directions. For example, assume that a stepper _A tends to deviate a resulting pattern to the right as a whole, whereas a stepper _B will deviate it to the left at large. Applying the steppers _A and _B to the same workpiece will lead to a serious problem. Specifically, if an interconnection and a contact hole are formed using different steppers of which one exhibits an inclination to the right and the other to the left, the interconnection and the contact hole that should overlap will be separated from each other, hindering implementation of a circuit. There may also be a case where two interconnections that should be separated will overlap with each other. On the contrary, if the same workpiece is processed using the same processing device in the identical processing at different steps, such subtle deviating inclination unique to the processing device is always in the same direction, and thus, it is possible to limit the variation in a fixed range. The method as proposed is effective when it is applied to a photolithographic process step during manufacture of a semiconductor device. If each workpiece is processed by one and the same photolithographic device, variation will be suppressed, and good product characteristics will be readily obtained.

The manufacturing steps, however, of the semiconductor device are complicated. The above-described photolithographic process steps, for example, are repeated twenty to thirty times through the entire processing. Therefore, when two or more lots arrive at a particular processing device at the same timing, the lot(s) may have to wait before being processed even if there is another processing device not in use. Thus, the good product characteristics had to be set off by low production efficiency.

SUMMARY OF THE INVENTION

An object of the present invention is to provide a process control device and a process control method for control of processing steps of workpieces in which at least two process steps are applied to the same workpiece at a processing part having a plurality of processing devices placed in parallel therein, that ensure good product characteristics while maintaining high production efficiency.

The process control device according to an aspect of the present invention is a process control device for control of a first process step for processing workpieces sorted into a lot and a second process step for further processing the lot processed in the first process step performed at the same processing part having a plurality of processing devices placed in parallel therein. The processing control device includes: a device group information storing unit for storing information about grouping of the processing devices into a plurality of device groups; and a device group selecting unit for selecting the device group such that the lot is processed in the second process step by a processing device included in the same device group as a processing device used in the first process step.

With such grouping of processing devices, it is unlikely that lots waiting to be processed cluster around a single, specific processing device. This prevents degradation of production efficiency. A lot is processed in identical processing at different steps by any of the processing devices belonging to the same device group. Thus, variations attributable to deviating inclinations of processing devices are prevented from appearing in a wide range extending to the right and to the left. As a consequence, it is possible to obtain good product characteristics and also to maintain high production efficiency since the same process steps need not be done again. Note that "a processing device included in the same device group as a processing device used in the first process step" in the above description includes the very processing device used for the first process step.

In the process control device according to the one aspect described above, the device group selecting unit may include a corresponding-device-group-name storing unit that stores the name of the device group corresponding to a lot.

By storing the name of the device group corresponding to the lot, the second process step is reliably performed by a device group the same as that for the first process step. Note that the action to store the name of the device group corresponding to a lot may also be expressed as "to hold the device group name" in the description below.

In the process control device according to the one aspect described above, the device group information storing unit may store the grouping of the device groups that is predetermined such that the processing devices having identical deviating characteristics are grouped into the same group.

The expression reading "the processing devices having identical deviating characteristics" means that the processing results of the processing devices appearing on the lots exhibit identical deviating characteristics; for example, the patterns formed tend to deviate to the right, not to the left, as a whole. As the processing devices that are likely to produce the similarly deviating processing results belong to the same device group, variation attributable to the deviating inclinations of the devices can be restricted. If the processing device is a stepper, steppers that tend to make the patterns deviate to the right as a whole are put into one group, and steppers that are likely to make the patterns deviate to the left as a whole are put into another group. In other words, the steppers exhibiting deviating inclinations to the right and those exhibiting deviating inclinations to the left are not grouped into the same device group. As a result, even though the patterns for the interconnection and the contact hole are formed at different stages using different steppers, if the steppers belong to the same device group and tend to deviate the patterns to the same direction as a whole, it is possible to have an interconnection and a contact hole overlapping with each other as desired. If such grouping is not done, the interconnection pattern and the contact hole pattern may be formed using two steppers having deviating inclinations to the opposite directions. In such a case with the conventional technique, the interconnection and the contact hole that should be overlapped will separate from each other. In addition, according to the conventional art, interconnections that should be separated when seen as a plane may overlap with each other. By conducting the grouping according to the present invention as described above, it becomes possible to obtain good product characteristics while avoiding degradation of production efficiency due to multiple lots gathering around one stepper.

In the process control device according to the one aspect described above, the device group information storing unit may store a target number of lots to be processed. This number is assigned to each device group.

The target number of lots is used as an index of frequency by which lots are actually to be allocated to each device group. Therefore, if a certain device group needs mending so that the number of lots to be processed therein has to be decreased, or if the group currently has a large amount of workpieces, then it is possible to set the target number of lots for that device group smaller than that for another device group. Such target number of lots for a device group may be included in the reference information, or an operator may manually input it based on the in-process information or the like. The target number of lots for a device group may literally be the number of lots. Alternatively, it may be a ratio or proportion of the group to the whole groups regarding the target number of lots to be allocated thereto, or, an inter-group allocation ratio of the target number of lots. Note that the target number of lots to be processed does not need to correspond to the processing capability of each device group, as described above.

In the process control device according to the one aspect described above, the target number of lots may be the number of lots that can be processed in a unit time by each device group.

By recognizing the processing capability of the device group, it is possible to allocate lots to device groups, prior to the first process step, corresponding to their processing capabilities. Thus, the load of processing can be allocated to each device group in balance with its processing capability, whereby the entire production efficiency is improved. Further, the failure rate can be reduced and durability can be improved for each processing device.

The process control device according to the one aspect described above may include: a target-number-of-lots storing unit for storing the target number of lots; an actual-number-of-processed-lots detection unit for detecting the number of lots that have actually been processed by each device group; and an inter-group lot allocation determination unit for determining, prior to the first process step and according to the detection result of the actual-number-of-processed-lots detection unit, which device group processes a lot at the first process step, such that the number of lots being processed by each device group becomes equal to the target number of lots for the group.

By recognizing the past processing performance of each device group at the time point where the lots are to be processed, it is possible to find the difference between the actual number of processed lots and the processing capability of the device group, so that the lots can be allocated to correct such imbalance. Therefore, the load of processing can be distributed to each device group corresponding to the processing capability thereof, preventing the processing from being concentrated onto a particular device group. Thus, high production efficiency can be maintained. The target number of lots may be altered as required. If, for example, a device group encounters an emergent situation in which a mask should be changed, a device is broken, or the number of workpieces has suddenly increased, the above-described inter-group lot allocation ratio for the group can be set to a smaller value or even zero for a prescribed time period. As this ratio serves as an index for lot allocation, the number of lots being allocated to the device group becomes very small. Thus, the lots can be allocated to respective device groups corresponding to their substantial processing capabilities that change according to the situations. In addition, if the target number of lots is equalized with the maximum number of lots that can be processed by each device group within its processing capability, the load can be distributed corresponding to the capability of each group. This helps improve durability of the processing devices.

The process control device according to the one aspect described above may further include a lot transport unit that transports a lot to a location where the device group designated by the inter-group lot allocation determination unit is placed.

With such a lot transport unit, lot processing may proceed smoothly. Note that the location where the device group is placed refers to, for example, a storage cabinet (shelf) that is placed in association with a representative processing device that is designated for the device group.

The process control device according to the one aspect described above may include: a priority determination unit that determines priority in processing order of the lots waiting to be processed by a device group; and a lot selecting unit that selects, according to the priority, a lot to be processed next by a processing device that has finished processing of another lot, and subjects the lot to the processing.

With such configuration, it is possible to minimize the time period in which a processing device is not in use. In addition, each product can be manufactured taking its circumstances into consideration. As a result, a product can be manufactured with flexibility according to its circumstances, such as necessity thereof, with product characteristics being improved and high production efficiency being maintained. Note that the above-described priority may have different criteria for different processing devices. Specifically, the priority for some processing devices may be in compliance with the arrival order of lots at the location where the device group is placed. For other processing devices, the circumstances of the products, such as the necessity thereof, may be given priority over the lot arrival order as above.

The process control method according to another aspect of the present invention is a process control method for control of a first process step for processing workpieces sorted into a lot and a second process step for further processing the lot processed in the first process step performed in the same processing part having a plurality of processing devices placed in parallel therein. The process control method includes the steps of: storing information about grouping of the processing devices into a plurality of device groups; and selecting a device group such that the lot is processed in the second process step by a processing device included in the same device group as a processing device which performed the first process step.

With this control method, lots waiting to be processed are prevented from concentrating onto a particular processing device, whereby degradation in production efficiency is avoided. A lot is subjected to identical processing at different steps using any of the processing devices in the same device group. Therefore, it is possible to restrict the deviation, resulting from deviating inclinations specific to respective processing devices, in one direction. As a consequence, good product characteristics can be obtained. In addition, the redo rate of the same process step is decreased, and thus, high production efficiency is maintained. Note that "a processing device included in the same device group as a processing device which performed the first process step" in the above description includes the very processing device which performed the first process step.

In the process control method according to the another aspect described above, the step of selecting the device group may include the step of storing the name of the device group corresponding to the lot.

By holding the name of the device group corresponding to the lot, it is ensured that the processing devices in the same device group are used for, e.g., photolithography processing.

In the process control method according to the another aspect described above, the device group may be formed in advance such that processing devices having identical deviating characteristics are grouped into the same device group.

With such control method, variation in product characteristics can be restricted by limiting the deviation resulting from inclinations specific to respective processing devices in one direction. Therefore, good product characteristic can be obtained, and high production efficiency is guaranteed with reduction of the redo rate. As described above, the concept of the "characteristics of a processing device" includes a structural factor, such as deviation in a fixed direction of a pattern manufactured by a stepper.

In the process control method according to the another aspect described above, the device group may have a target number of lots to be processed that is allocated to each device group.

The target number of lots for a device group is an index of frequency by which lots are actually to be allocated to each device group. Therefore, if a certain device group currently has many workpieces, then the target number of lots for the device group is set smaller than that of another device group. With such setting, lots can be allocated to each device group according to the substantial processing capabilities of the processing devices that change with time. Thus, high production efficiency is maintained. Such target number of lots of each device group may be included in the reference information. Alternatively, an operator may manually input the number based on the work-in-process information or the like. The target number of lots may literally be the number of lots, or it may be an inter-group allocation ratio of the target number of lots.

In the process control method according to the another aspect described above, the target number of lots may be the number of lots that can be processed in a unit time by each device group.

By recognizing the processing capability of each device group, it is possible to allocate lots to device groups, prior to the first process step, for example, corresponding to their capabilities. Therefore, the load of processing can be distributed to device groups in balance with their processing capabilities, which improves the entire production efficiency. In addition, the failure rate can be reduced and durability can be improved for each processing device.

The process control method according to the other aspect described above may include the steps of: storing the target number of lots; detecting the number of lots having actually been processed by each device group; and determining, prior to the first process step and according to the result of the detecting step, which device processes a lot at the first process step, such that the number of lots being processed by a device group becomes equal to the target number of lots for the group.

The target number of lots for a device group as explained above can be changed as necessary. Specifically, if an emergent situation occurs in a certain device group, such as a need to change a mask, breakdown of a device, or a sudden increase in workpieces, the inter-group lot allocation ratio for the group can be set to a smaller value or zero for a prescribed period of time. As this ratio serves as an index for lot allocation, the number of lots being allocated to the device group becomes very small. Thus, it is possible to allocate lots to device groups corresponding to their substantial processing capabilities according to the situations. Further, the lots are allocated to the device groups based both on the processing capability of each device group and on the number of lots that have already been processed therein at the time point where the lots are to be processed, as described above. Therefore, the load of processing can constantly be maintained in balance with the processing capability of each device group. As a consequence, lots waiting to be processed are prevented from clustering around a specific device group. Further still, the number of lots having actually been processed by each device group is recognized at the time of lot distribution, as described above. Thus, the lots can be allocated to correct any imbalance between the load distribution and the processing capability of each device group. Accordingly, it is possible to distribute the load of processing to each device group corresponding to its processing capability. The concentration of processing onto a specific device group is avoided, and high production efficiency is maintained. Durability of processing devices is also improved.

The process control method according to the other aspect described above may further include the step of transporting a lot to a location where a device group designated by the inter-group lot allocation determination unit is placed.

With such a lot transporting step, the processing of lots may proceed smoothly, and high production efficiency is maintained. Note that the location where a device group is placed is specifically a place where a storing cabinet (shelf) is placed corresponding to a representative processing device designated for the device group.

The process control method according to the other aspect described above may include the step of determining priority in processing order of lots waiting to be processed by a device group; and the step of selecting, according to the priority, a lot to be processed next by a processing device which has finished processing of another lot.

With such configuration, the time period in which a processing device is not in use can be minimized, and each product can be manufactured corresponding to its circumstances, such as necessity thereof. As a result, products can be manufactured with flexibility corresponding to their individual circumstances, with product characteristics being improved and high production efficiency being maintained. The priority described above may have different criteria for different processing devices. Specifically, the priority for some processing devices may be in compliance with the arrival order of lots at the location where the device group is placed. Other processing devices may assign higher priority to individual circumstances of each product, such as necessity thereof, than to the lot arrival order as described above.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 7 illustrates data configuration of lot-in-process file FDLOTDB in the process control device according to the second embodiment.

FIG. 8 illustrates data configuration of process route tag FDPROUT in the process control device according to the second embodiment.

FIG. 9 illustrates data configuration of device group FDTOOLG in the process control device according to the second embodiment.

FIG. 11 illustrates data configuration of determination step control method FDCPARM in the process control device according to the second embodiment.

FIG. 12 illustrates data configuration of photolithographic device group definition FDSTGRP in the process control device according to the second embodiment.

FIG. 13 illustrates data configuration of photolithographic device group situation FDSTGACT in the process control device according to the second embodiment.

FIG. 14 illustrates data configuration of determination step control method FDAPARM in the process control device according to the second embodiment.

FIG. 15 illustrates data configuration of allocation result holding data in the process control device according to the second embodiment.

DESCRIPTION OF THE PREFERRED EMBODIMENTS

Hereinafter, embodiments of the present invention will be described with reference to the drawings.

First Embodiment

Figure 1:
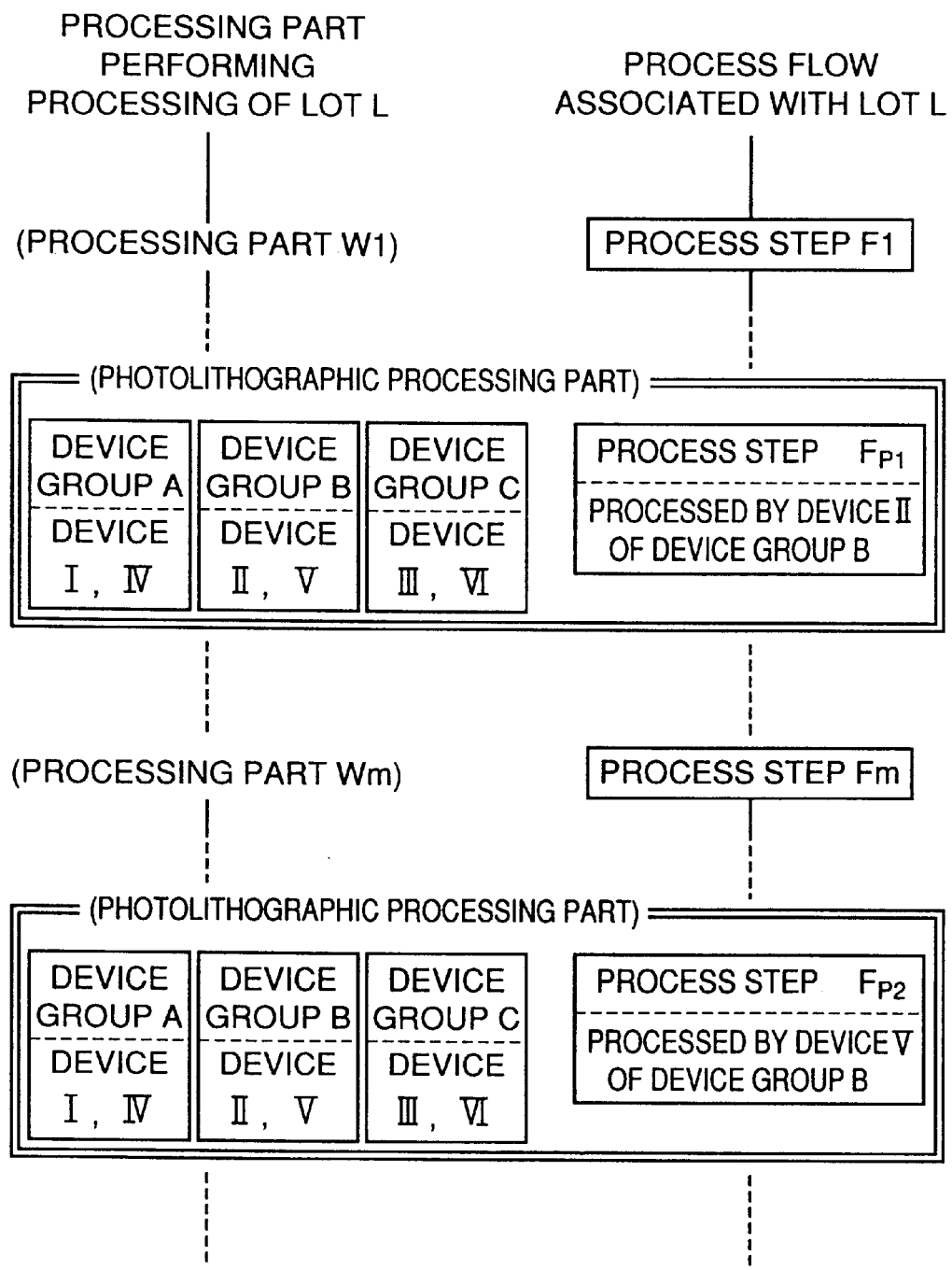
FIG. 1 illustrates a process flow in association with a lot and processing parts performing the lot processing that are controlled by a process control device according to a first embodiment of the present invention.

Referring to FIG. 1, a process flow (process steps) associated with a specific lot L is shown on the right side of the drawing from top to bottom, and processing parts performing the respective process steps are shown on the left. The present invention is on the premise that a lot is subjected to identical processing several times, before it is completed, in a processing part having a plurality of identical devices provided in parallel therein. In a photolithographic processing part employed in manufacture of semiconductor devices such as DRAMs and thin film transistors (TFTs) of liquid crystal display devices, the photolithographic process is repeated twenty to thirty times until a product is completed, and also many processing devices are provided in parallel with one another at the part. Therefore, the photolithographic processing part corresponds to the processing part described above and thus is an object of the invention. Further, the present invention is intended for processing devices exhibiting subtle deviating inclinations that emerge even under identical processing conditions and that produce different processing results. In photolithographic processing, even if the same masks and same conditions are used for the processing, the processing results, or the product characteristics, vary for the processing devices, due to subtle differences in precision of lenses and light sources. Thus, the photolithographic processing device is the target for application of the present invention.

Based on the above, the most fundamental factors of the present invention are as follows: (a) the processing devices in a single processing part as described above are divided into groups in each of which differences in the devices are small; and (b) if one device group is used to apply a certain kind of processing for the first time to a lot, subsequent identical processing is applied to the same lot using the same device group. According to the example shown in FIG. 1, a device II belonging to a device group B performs the first photolithographic process for the lot L, and device II or V (V in the case of FIG. 1) belonging to the same device group B performs the second photolithographic process for lot L.

Such control is conducted for the processing devices having subtle deviating inclinations uncontrollable by processing conditions and affecting their processing results as described above. As a consequence, variations are restricted and good product characteristics are maintained. In addition, the redo rate decreases, such that production efficiency improves.

Second Embodiment

Figure 2:
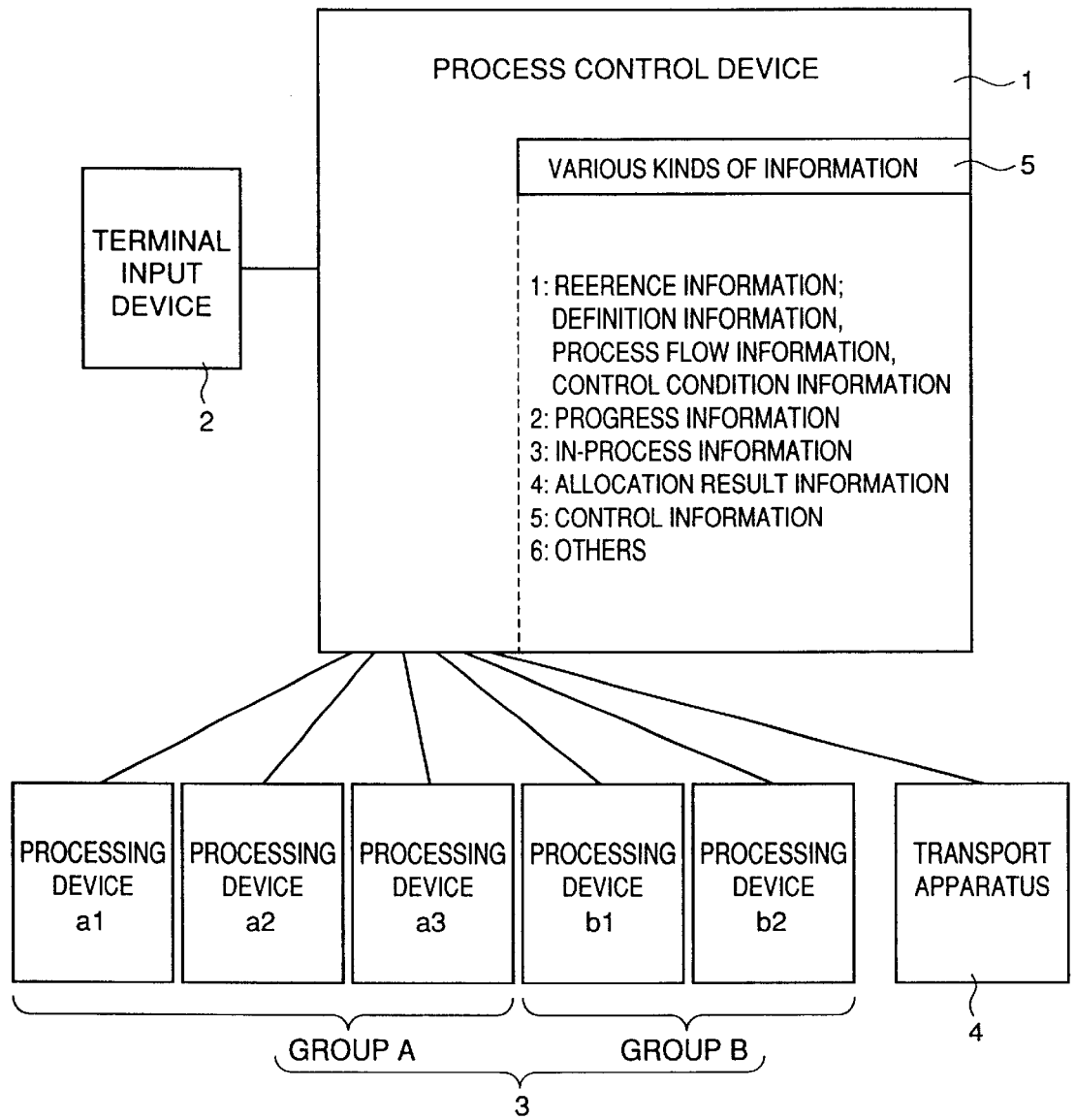
FIG. 2 is a block diagram showing a schematic configuration of a production management system including a process control device according to a second embodiment of the present invention.
Figure 3:
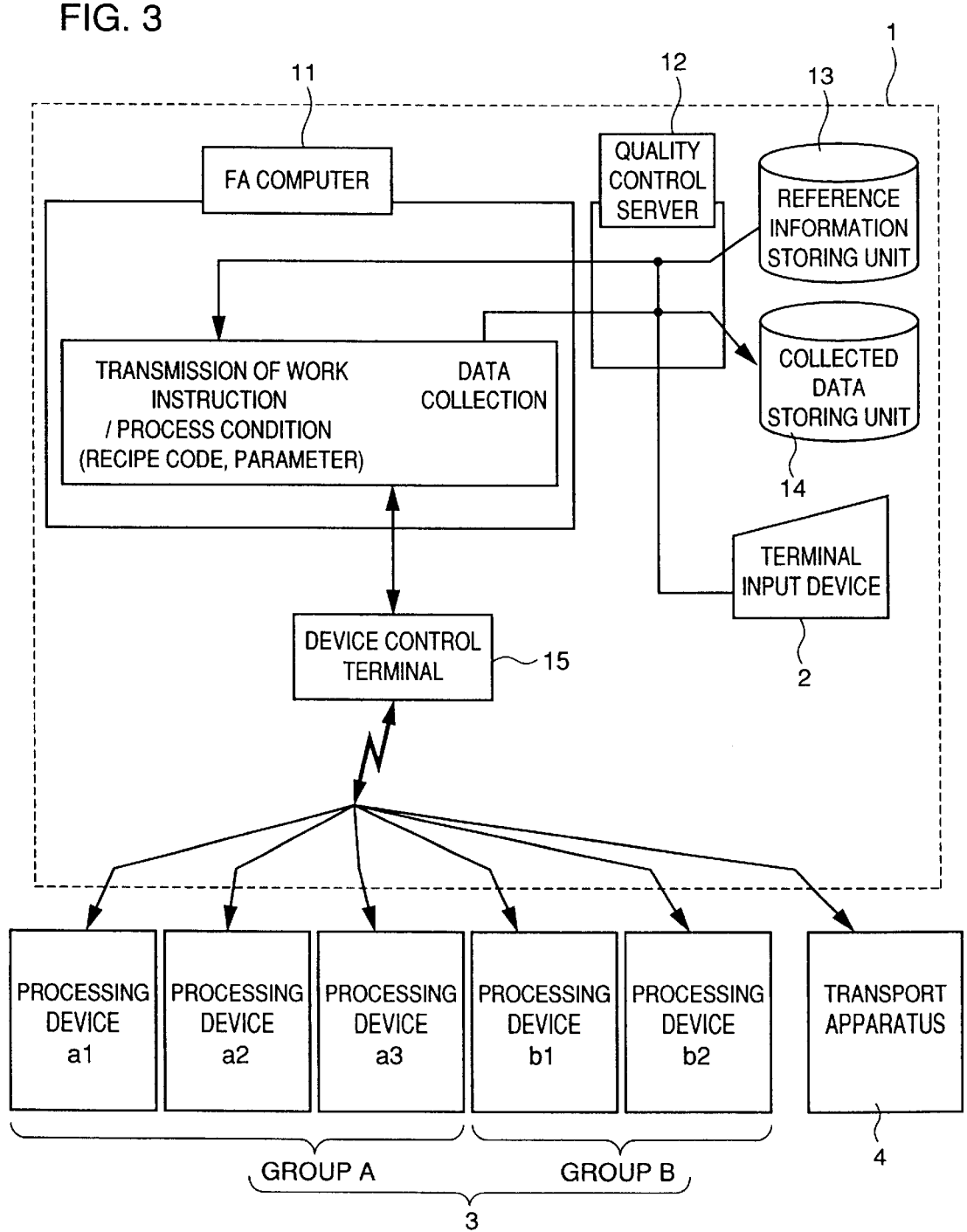
FIG. 3 is a block diagram showing a configuration of the process control device according to the second embodiment.

Referring to FIGS. 2 and 3, a process control device 1 includes: a factory administration host computer (FA computer) 11; a quality control server 12; and a device control terminal 15. Further, process control device 1 includes: a reference information storing unit 13 for storage of reference information including a process flow of a lot; and a collected data storing unit 14 for storage of in-process information of a lot or the like. The reference information or the like may be manually input via a terminal input device 2. Using this terminal input device 2, a ratio or proportion of one device group to the whole device groups regarding the number of lots to be processed therein (hereinafter, an "inter-group lot allocation ratio") or the target number of lots for each device group may be altered as necessary. For example, according to a circumstance such as breakdown of a processing device or a need to change a mask in a device group, the above-described ratio or the target number of lots may be set lower for the relevant device group, so that the actual number of lots being allocated to the group can be decreased. In other words, in the case where the actual number of lots to be processed in a certain device group should be limited to a small number, it is possible to set the inter-group lot allocation ratio or the target number of lots for the relevant group small in response to the situation.

Process control device 1 controls process steps of a lot by referring to, generating and updating various kinds of information 5. Those various kinds of information include: reference information including process flow information, definition information and information about a processing condition at a process step; progress information representing a progress situation of a lot; in-process information representing a location and a state of a lot; allocation result information representing a result of allocation of a lot to a device group for processing; and control information for control of a process step of a lot by processing device 3 and for control of transportation by transport apparatus 4.

The process flow information is information of process steps associated with a lot until its completion, which is determined according to the product type of the lot. The definition information is information regarding, for example, grouping of processing devices in a photolithographic process, which is determined in advance. The process flow information and the definition information are stored in reference information storing unit 13. The progress information is automatically updated at the time of introduction of a lot into a process step, at the start of the process step, and at the start and the end of lot transportation. It may also be updated directly by an operator via terminal input device 2. The in-process information includes in-process information of a processing device and in-process information of transportation. The allocation result information is information regarding a result of allocation of lots to device groups. Herein, a lot about to be first processed in a process step that is an object of the present invention is allocated to a device group such that each device group performs processing corresponding to its processing capability. The control information, which is generated according to generation of the progress information, is updated as necessary in response to changes in control states in processing device 3 and transport apparatus 4. The control information includes information about a lot, among the lots allocated to a device group, to be processed next by a processing device, among the devices within the device group, that has just finished its operation for another lot and become empty.

Figure 4:
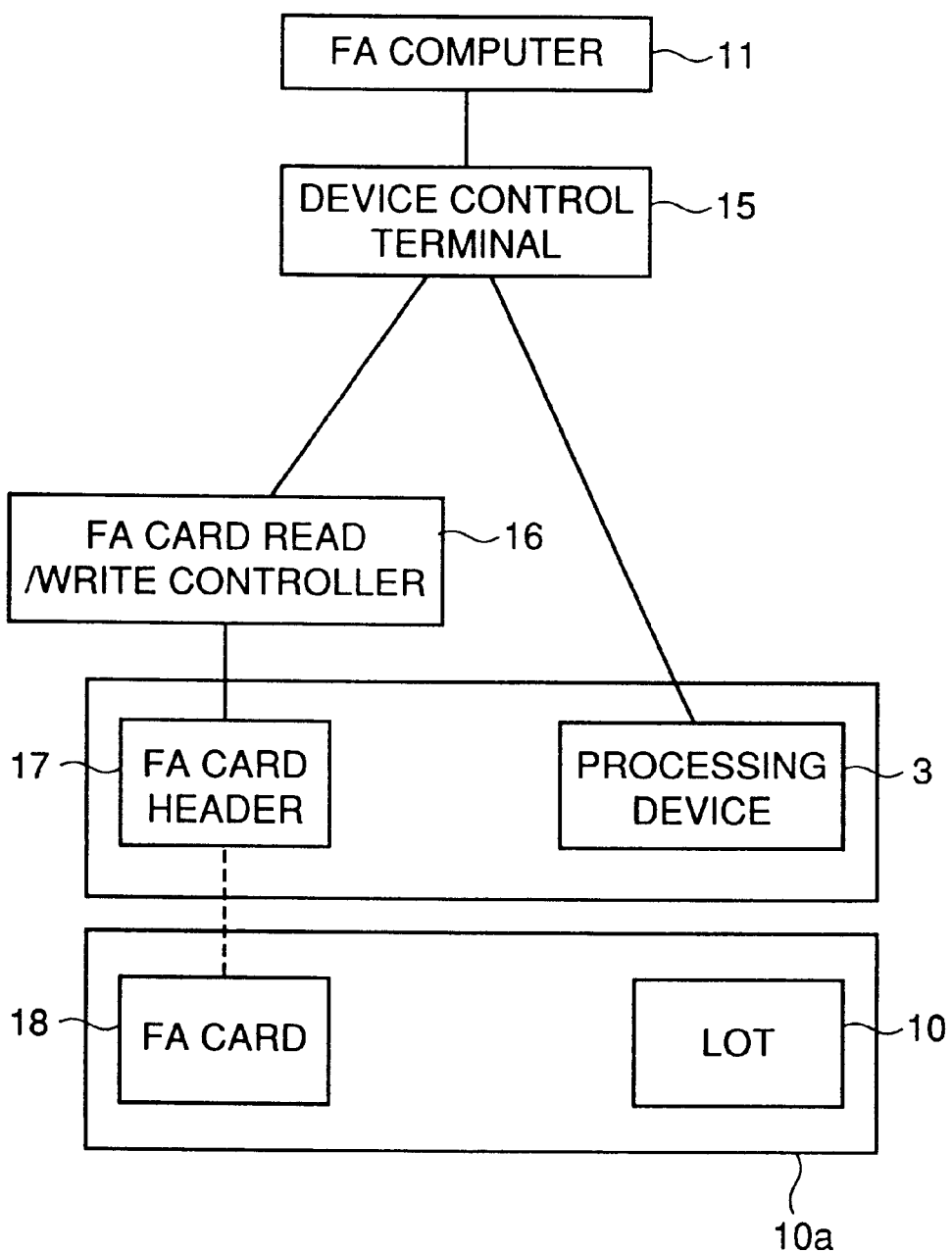
FIG. 4 illustrates information exchange between a device control terminal of the process control device shown in FIG. 3 and a processing device and a lot.

Now, a configuration connecting the device control terminal and the processing device will be described with reference to FIG. 4. In the case where the processing device is for manufacture of semiconductor devices, 25 wafers are inserted in a dedicated cassette 10a, which is called a lot as a whole. Each lot is provided with a lot product number (key No.) and is managed using this key No. Attached to each cassette is an FA card (commercially available) 18 that stores the key No., a process step scheduled next and the like. Attached to each processing device 3 is an FA card header (commercially available) 17 that exchanges information with FA card 18 via optical communications as follows:

(1) At the start of processing, when a lot is mounted on a processing device, a starting button of FA card 18 is pushed. FA card 18 notifies FA card header 17 and an FA card read/write controller 16 that the lot has been mounted on the processing device. FA card read/write controller 16 converts the optical signal received into an electrical signal, and sends the signal to the device control terminal 15.

(2) Device control terminal 15 determines whether processing device 3 is in an operable state, and if so, sends a processing start request to an FA computer 11. The operator registers such state of the device.

(3) FA computer 11 retrieves the reference information and determines, according to the key No. of the lot, whether the processing device is capable of processing the lot, and also determines whether the process step is the correct one for the lot. If the processing can be started, FA computer 11 notifies device control terminal 15 of a control condition that has been set in the reference information.

(4) Device control terminal 15 receives the information from FA computer 11, and sends a processing start request to processing device 3. Device control terminal 15 and processing device 3 communicate with each other by SECS (semiconductor standard communication protocol) or MSEC (semiconductor communication protocol of Mitsubishi Electric Corporation).

(5) Processing device 3 receives the start request from device control terminal 15 and starts processing of the lot mounted on the device.

(6) When the processing is completed, processing device 3 reports the completion of the processing to device control terminal 15. Upon reception of the completion report from processing device 3, device control terminal 15 reports the completion to FA computer 11.

(7) When receiving the completion report from device control terminal 15, FA computer 11 stores the completion data of the lot, and transfers the information of the lot to a next process step. Upon completion of the information processing, FA computer 11 sends its completion report along with the information about the next process step or the like to device control terminal 15.

(8) Upon reception of the report as above, device control terminal 15 sends the information of the next process step or the like to FA card read/write controller 16, which then rewrites FA card 18.

(9) Upon completion of the rewriting of FA card 18, a series of processing is completed. The lot mounted on processing device 3 is transported to the next process step.

Figure 5:
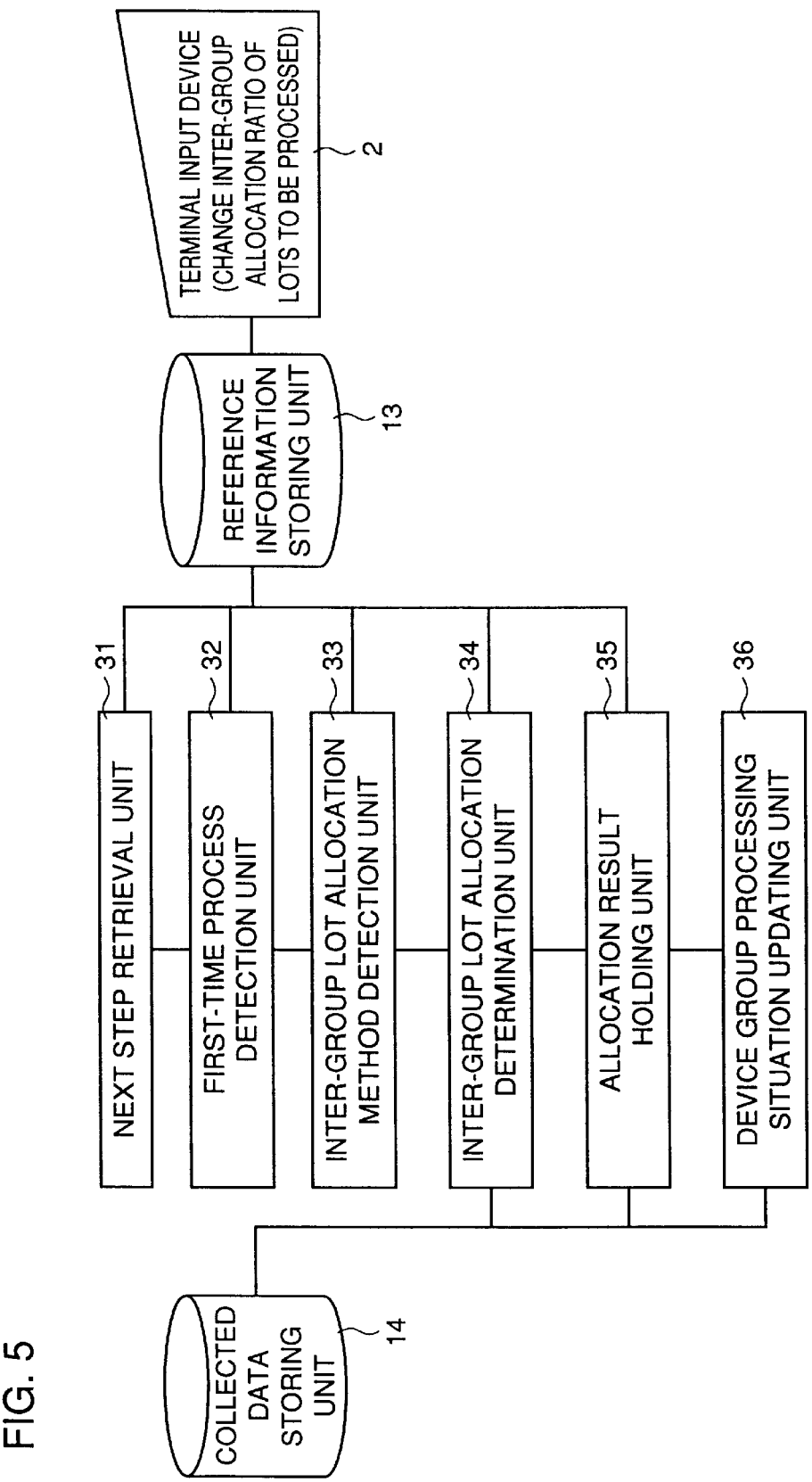
FIG. 5 is a block diagram showing a schematic configuration of the process control device according to the second embodiment.

Referring to FIG. 5, the process control device according to the present embodiment includes: a next step retrieval unit 31 that retrieves a next process step; a first-time processing detection unit 32 that detects, when the next process step is an object for control of the present invention, whether the next step is for applying the processing of that kind for the first time to the lot; and an inter-group lot allocation method detection unit 33 that detects, if the next step is the first-time processing, on what basis a lot is to be allocated to a device group. These kinds of information are pre-stored in reference information storing unit 13. Further, the process control device includes an inter-group lot allocation determination unit 34 that determines to which device group a lot is allocated for processing, based both on the processing capability of each device group stored in the reference information storing unit and on the actual number of lots having been processed in each device group stored in collected data storing unit 14, so that the number of lots to be processed in a device group corresponds to the processing capability of the group. Note that, however, the allocation of the lots may be conducted irrelevant to the processing capabilities of the device groups. For example, if a processing device is out of order or if a mask needs to be changed in a certain device group, then the number of lots to be allocated to the group may be reduced by setting, via terminal input device 2, the target number of lots to be processed or the inter-group lot allocation ratio for the group smaller than usual. In other words, it is possible to allocate an appropriate number of lots to each processing device group, by changing the target number of lots to be processed or the inter-group lot allocation ratio for the group, corresponding to the situation of the group. Further still, the process control device includes: an allocation result holding unit 35 that holds the allocation results determined as above (or stores the name of the device group corresponding to the lot); and a device group processing situation updating unit 36 that updates the processing situation of a device group according to the determination on lot allocation above. The information kept in allocation result holding unit 35, or the corresponding-device-group-name storing unit, is used by the transport apparatus to transport each lot to a device group assigned therefor. Further, the process control device includes a lot selecting unit (not shown) that selects, from lots waiting to be processed, a lot to be processed next by a processing device within the relevant device group that has finished processing of another lot, according to a prescribed priority. Factors determining the priority may include the arrival order of lots to a storage cabinet of the device group, and a degree of necessity of each product. Some processing devices may put the priority on the arrival order of lots to the storage cabinets. Other devices may give the priority to the degree of necessity of the products.

Figure 6:
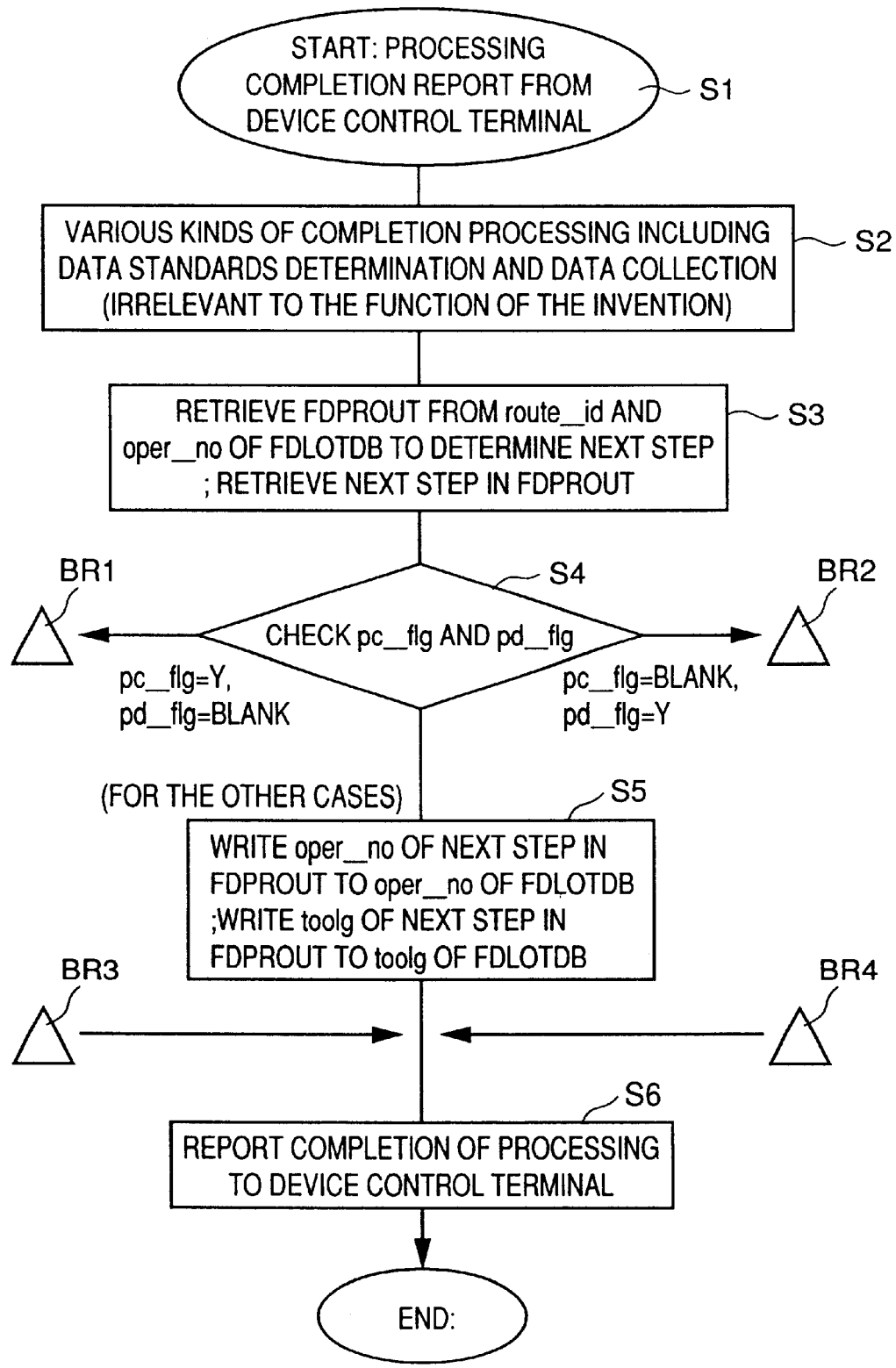
FIG. 6 is a flow chart illustrating processing procedures in the process control device according to the second embodiment.

Hereinafter, a procedure of control being conducted by the above-described process control device and configurations of data being exchanged during the procedure will be described. Referring to FIG. 6, the control starts with reception of a processing completion report from device control terminal 15 (S1). Various kinds of completion processing are then performed (S2), which include data standards determination, data collection or the like. Such completion processing (S2) is irrelevant to the function of the present invention. Thereafter, a next process step is determined (S3). Specifically, the next step in a process route tag FDPROUT stored in the reference information storing unit is retrieved from route__id and oper__no in a lot-in-process file FDLOTDB stored in the collected data storing unit. The lot-in-process file, as shown in FIG. 7, includes descriptions of key No., product type, process route tag, next process step name and next processing device group name.

In S4 of FIG. 6, pc__flg and pd__flg of process route tag FDPROUT are checked. If the next process step is 00600 shown in FIG. 8, pc__flg=yes and pd__flg=blank, so that control goes to BR1. The condition that pc__flg=yes and pd__flg=blank corresponds to the case where the lot is to be processed in a photolithographic processing part for the first time. Conversely, the condition that pc__flg=blank and pd-flg=yes corresponds to the case of the second or subsequent photolithographic process step applied to the lot. Here, the following point should also be taken into account. In process route tag FDPROUT shown in FIG. 8, pc__flg=yes and pd__flg=blank at both process steps 00600 and 01100. These steps 00600 and 01100 are both the photolithographic process steps, but their characteristics may differ from each other. In such a case, two types of grouping are prepared for the processing devices, reflecting the different characteristics of the process steps, and a grouping X1 is employed for the photolithographic process step 00600 and a grouping E1 is employed for the step 01100. The second or subsequent photolithographic process step for the same lot is performed by a processing device included in the same device group, according to the same type of grouping, as the processing device used for the first process step.

Herein, the first photolithographic processing is separated from the second or subsequent photolithographic processing. This is because that the device group for the second or subsequent processing is automatically determined once the first processing is conducted, and thus, the load of processing is distributed among the device groups at the first-time photolithographic processing such that it is balanced with the processing capability of each group. In the process route tag FDPROUT, a device group to be used for a process step as an object of the present invention, e.g., process step 00600, is already determined. Such device group is utilized only when the control of the present invention is not applied. When the control of the present invention is applied, the device group to be used will of course change according to the control.

Returning to FIG. 6, if the next process step is not the photolithographic process, the control goes to S5 (for the other cases). In S5, process step name oper__no of the next step in FDPROUT (FIG. 8) is written into process step name oper__no of FDLOTDB (FIG. 7), and device group name toolg of the next step in FDPROUT is written into device group name toolg of FDLOTDB. The grouping of processing devices is done as FDTOOLG shown in FIG. 9. As seen from FIG. 9, a plurality of groupings are defined with respect to the same group of the processing devices, which ensures flexibility. The writing described above is also performed to the FA card, as previously explained. Thereafter, completion of processing is reported to the device control terminal, and thus, the control of the process steps is completed.

Figure 10:
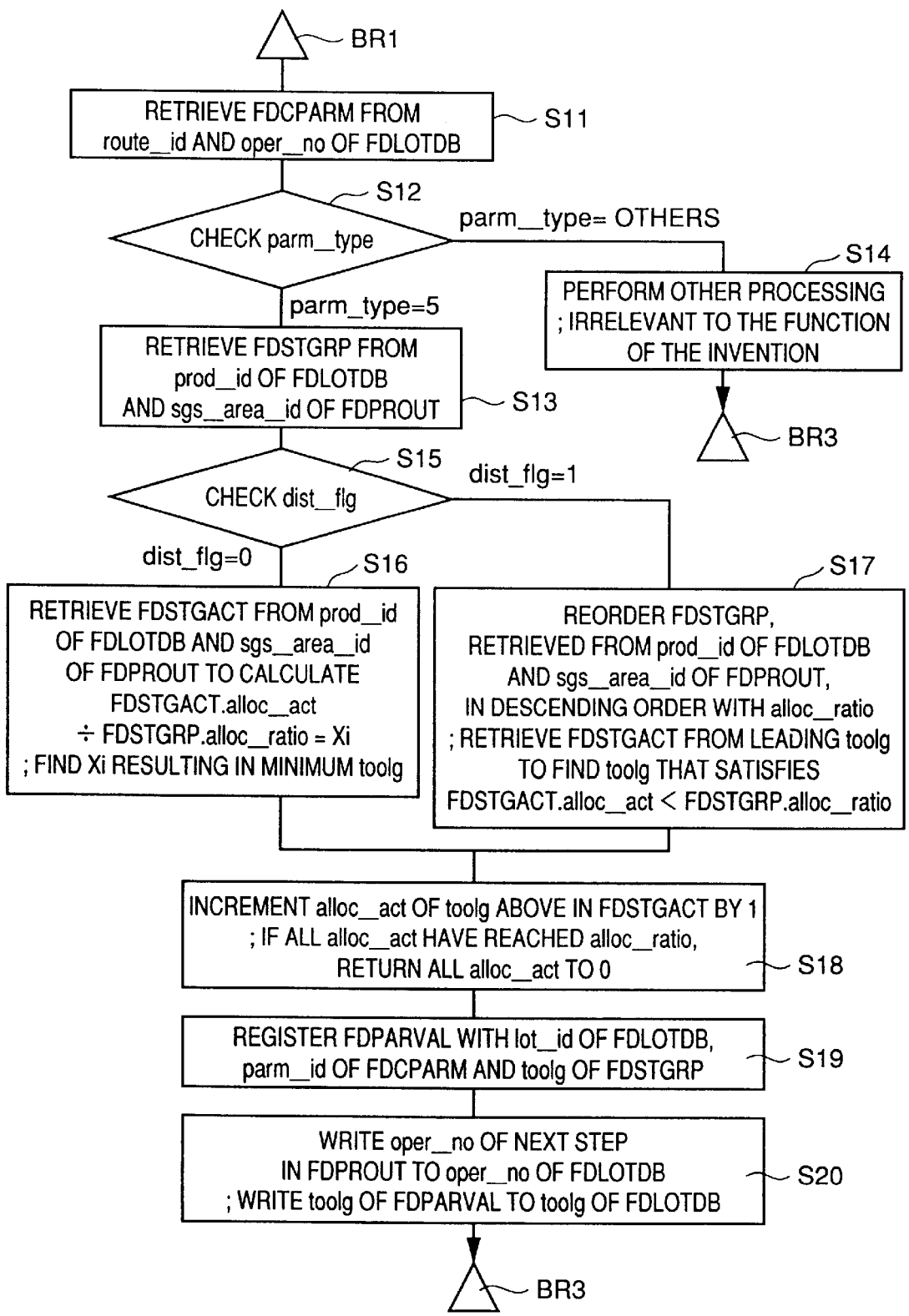
FIG. 10 is a flow chart illustrating processing procedures for determining, for the first time, a device group for a lot in the process control device according to the second embodiment.

Now, the branch BR1 shown in the flow chart of FIG. 6 corresponding to the case of the first-time photolithographic process (pc__flg=yes and pd__flg=blank) will be described with reference to FIG. 10. A determination step control method file FDCPARM (FIG. 11) is retrieved from route__id and oper__no of FDLOTDB (S11). It is determined whether parm__type of FDCPARM is 5 (S12). If parm__type=5, it is an object for control of the present invention, and therefore, a photolithographic device group definition file FDSTGRP shown in FIG. 12 is retrieved (S13). Otherwise, it is not an object for control of the present invention, and the control goes through S14 to BR3. In the case where parm__type=5, dist__flg of FDSTGRP is checked (S15) for determination of a way of allocating lots to device groups. If dist__flg=0, a ratio Xi of an actual inter-group lot allocation ratio alloc__act listed in a photolithographic device group situation file FDSTGACT (FIG. 13) with respect to an upper limit lot allocation ratio alloc__ratio for each device group listed in FDSTGRP is calculated, and toolg deriving the minimum Xi is found (S16). The subsequent photolithographic processing for this lot is performed by device group toolg thus found. In this manner, it is possible to balance the load of processing with the processing capability of each device group even during the operation. On the other hand, dist__flg=1 corresponds to the case where such balancing of the load with the processing capability is unnecessary during the operation and only necessary in the last result. The load balancing in this case is less complicated. Specifically, FDSTGRP retrieved from sgs__area__id of FDPROUT is reordered in descending order based on alloc__ratio. FDSTGACT is retrieved from the leading toolg to find a toolg for which FDSTGACT alloc__act<FDSTGRP alloc__ratio stands (S17). For the relevant lot, toolg thus found is used for the subsequent photolithographic processing. In S18, alloc__act of photolithographic device group situation file FDSTGACT is incremented by 1, or it is initialized if necessary. Next, an allocation result holding file FDPARVAL is registered by lot__id of lot-in-process file FDLOTDB, parm__id of FDCPARM, and toolg of FDSTGRP (S19). In S20, oper__no of the next step in FDPROUT is written into oper__no of FDLOTDB, and toolg of FDPARVAL is written into toolg of FDLOTDB. Thereafter, the control goes back through BR3 to a stage before S6 of FIG. 6.

Figure 16:
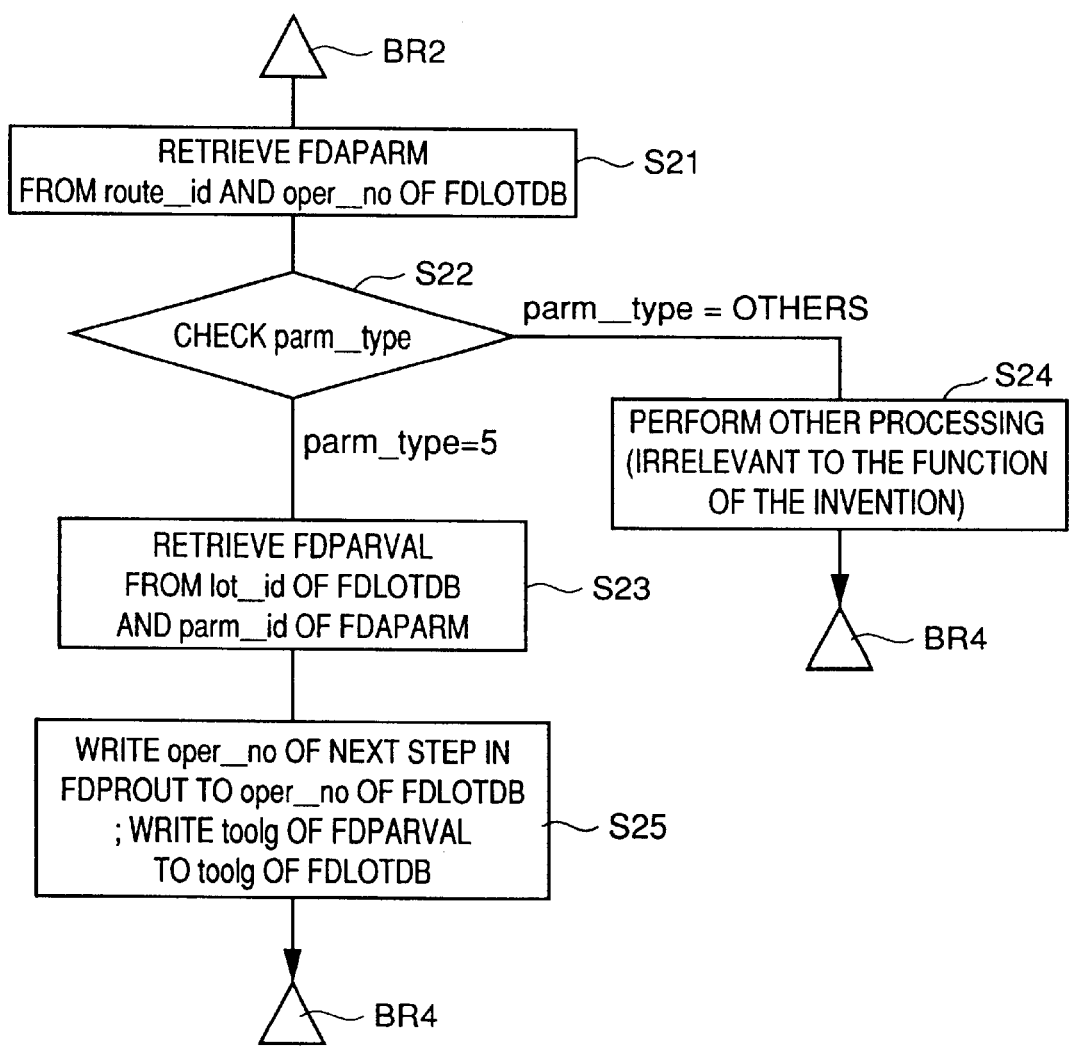
FIG. 16 is a flow chart illustrating processing procedures for determining a device group for a lot for its second or subsequent processing, in the process control device according to the second embodiment.

If the control follows the path BR2 shown in FIG. 16, a determination step control method file FDAPARM (FIG. 14) for the second or subsequent processing is retrieved from route__id and oper__no of FDLOTDB (S21), and a check is made whether parm__type is 5 (S22). If not, it is not an object for control of the present invention, and thus, the control immediately goes back through S24 and BR4 to a stage before S6 of FIG. 6. If parm__type=5, an allocation result holding file FDPARVAL (FIG. 15) is retrieved from key number lot__no of FDLOTDB and parm__id of FDAPARM for specification of device group toolg (S23). In S25, oper__no of the next step of FDPROUT is written into oper__no of FDLOTDB, and also the toolg specified in S23 in FDPARVAL is written into toolg of FDLOTDB, to indicate the device group for the next step. This device group is of course also written into the FA card.

The device group for the photolithographic process step is determined as described above. When an operator transports a lot to a device or issues an operation start request, the processing is only done by processing devices registered in this device group toolg. Therefore, the subsequent processing for the same lot is carried out only by the processing devices determined at the first-time process step 00500 shown in FIG. 8. A check at the start of processing is conducted to see whether the processing device in which the FA card read/write controller is installed is the one included in device group toolg registered in lot-in-process file FDLOTDB. If not, the processing is not started.

Thus, for the processing devices exhibiting subtle deviating inclinations uncontrollable by processing conditions and affecting the processing results, for those used for photolithographic processing among others, the above-described control is exerted. As a consequence, it is possible to maintain good product characteristics and to restrict defective fraction of the products. In addition, the redo rate is decreased, and therefore, the production efficiency is improved.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A process control device for controlling a plurality of processing devices placed in parallel to perform a first process step for processing workpieces sorted into a lot and a second process step for further processing the lot processed in the first process step, comprising:
    a device group information storing unit for storing information about grouping of said processing devices into a plurality of device groups; and
    a device group selecting unit for selecting one of said device groups such that said lot is processed in said second process step using a processing device included in the same device group as a processing device used in said first process step.

2. The process control device according to claim 1, wherein said device group selecting unit includes a corresponding-device-group-name storing unit for storing a name of said device group corresponding to said lot.

3. The process control device according to claim 1, wherein said device group information storing unit stores the information about grouping of device groups that is formed in advance to ensure that, of said processing devices, processing devices having identical deviating characteristics are grouped into a same device group.

4. The process control device according to claim 1, wherein said device group information storing unit stores a target number of lots to be processed that is allocated to each device group.

5. The process control device according to claim 4, wherein said target number of lots is the number of lots that can be processed in a unit time by each device group.

6. The process control device according to claim 4, further comprising: a target number of lots storing unit for storing said target number of lots; an actual-number-of-processed-lots detection unit for detecting the number of lots having actually been processed by said device group; and an inter-group lot allocation determination unit for determining, prior to said first process step and according to a detection result of the actual-number-of-processed-lots detection unit, which device group processes said lot at said first process step, such that the number of lots being processed by said device group becomes equal to said target number of lots of the device group.

7. The process control device according to claim 6, further comprising a lot transport unit for transporting said lot to a location where the device group designated by said inter-group lot allocation determination unit is placed.

8. The process control device according to claim 1, further including a priority determination unit for determining a priority in processing order for lots waiting to be processed by said device group, and a lot selecting unit for selecting, according to said priority, a lot to be processed next by a processing device that has finished processing of another lot.

9. A process control method for controlling a plurality of processing devices placed in parallel to perform a first process step for processing workpieces sorted into a lot and a second process step for further processing the lot processed in the first process step, comprising the steps of:
    storing information about grouping of said processing devices into a plurality of device groups; and
    selecting one of said device groups such that said lot is processed in said second process step using a processing device included in the same device group as a processing device used in said first process step.

10. The process control method according to claim 9, wherein the step of selecting one of said device groups includes the step of storing a name of said device group corresponding to said lot.

11. The process control method according to claim 9, wherein said device groups are formed in advance such that processing devices having identical characteristics are grouped into a same device group.

12. The process control method according to claim 9, wherein said device group includes a target number of lots to be processed that is allocated to each device group.

13. The process control method according to claim 12, wherein said target number of lots is the number of lots that can be processed in a unit time by each device group.

14. The process control method according to claim 12, comprising the steps of: storing said target number of lots; detecting an actual number of lots having been processed by said device group; and determining, prior to said first process step and according to a detected result of the detecting step, which device group processes said lot at the first process step, such that the number of lots being processed by said device group becomes equal to said target number of lots of the device group.

15. The process control method according to claim 14, further comprising the step of transporting said lot to a location where a device group designated by said inter-group lot allocation determination step is placed.

16. The process control method according to claim 9, further including the steps of: determining a priority in processing order for lots waiting to be processed by said device group; and selecting, according to said priority, a lot to be processed next by a processing device that has finished processing of another lot.

* * * * *